United States Patent [19]

Scalzi et al.

[11] Patent Number: 5,008,811
[45] Date of Patent: Apr. 16, 1991

[54] CONTROL MECHANISM FOR ZERO-ORIGIN DATA SPACES

[75] Inventors: Casper A. Scalzi, Poughkeepsie; Richard J. Schmalz, Wappingers Falls, both of N.Y.

[73] Assignee: International Business Machines Corp., Armonk, N.Y.

[21] Appl. No.: 154,688

[22] Filed: Feb. 10, 1988

[51] Int. Cl.$^5$ .............................................. G06F 12/00
[52] U.S. Cl. ............................. 364/200; 364/254.3; 364/255.7; 364/256.3; 364/256.4; 364/246.6
[58] Field of Search ................................ 364/200 MS

[56] References Cited

U.S. PATENT DOCUMENTS

| | | | |
|---|---|---|---|
| 4,096,573 | 6/1978 | | 364/200 |
| 4,136,385 | 2/1979 | | 364/200 |
| 4,355,355 | 10/1982 | Butwell et al. | 364/200 |
| 4,366,537 | 12/1982 | | 364/200 |
| 4,430,705 | 2/1984 | | 364/200 |
| 4,500,952 | 2/1985 | | 364/200 |
| 4,521,846 | 6/1985 | | 364/200 |
| 4,758,951 | 7/1988 | Sznyter, III | 364/200 |
| 4,785,392 | 11/1988 | Maier et al. | 364/200 |
| 4,816,991 | 3/1989 | Watanabe et al. | 364/200 |
| 4,835,734 | 5/1989 | Kodaira et al. | 364/900 |
| 4,849,881 | 7/1989 | Eguchi | 364/200 |
| 4,868,738 | 9/1989 | Kish et al. | 364/200 |
| 4,876,646 | 10/1989 | Gotou et al. | 364/200 |
| 4,943,913 | 7/1990 | Clark | 364/200 |

OTHER PUBLICATIONS

IBM System/370 Extended Architecture Principles of Operation (Jan. 1987).
MVS/Extended Architecture Supervisor Services and Macro Instructions (Jun. 1987).
An Introduction to Data-in-Virtual (May 1987).
MVS/Extended Architecture System Logic Library: Data-in-Virtual (Jun. 1987).

Primary Examiner—Gareth D. Shaw
Assistant Examiner—Maria Napiorkowski
Attorney, Agent, or Firm—William B. Porter

[57] ABSTRACT

Within a data processing system, a control mechanism for supporting a data space without common segments in addition to traditional address spaces containing common segments. Logic for eliminating duplication of lookaside table entries for virtual addresses within shared segments, but not for identical virtual addresses within data address spaces is provided, as well as for overriding low address protection for store operations into data spaces. Thus, the entire virtual addressing range is available to programs wishing to use such data spaces for data isolation and data sharing.

6 Claims, 14 Drawing Sheets

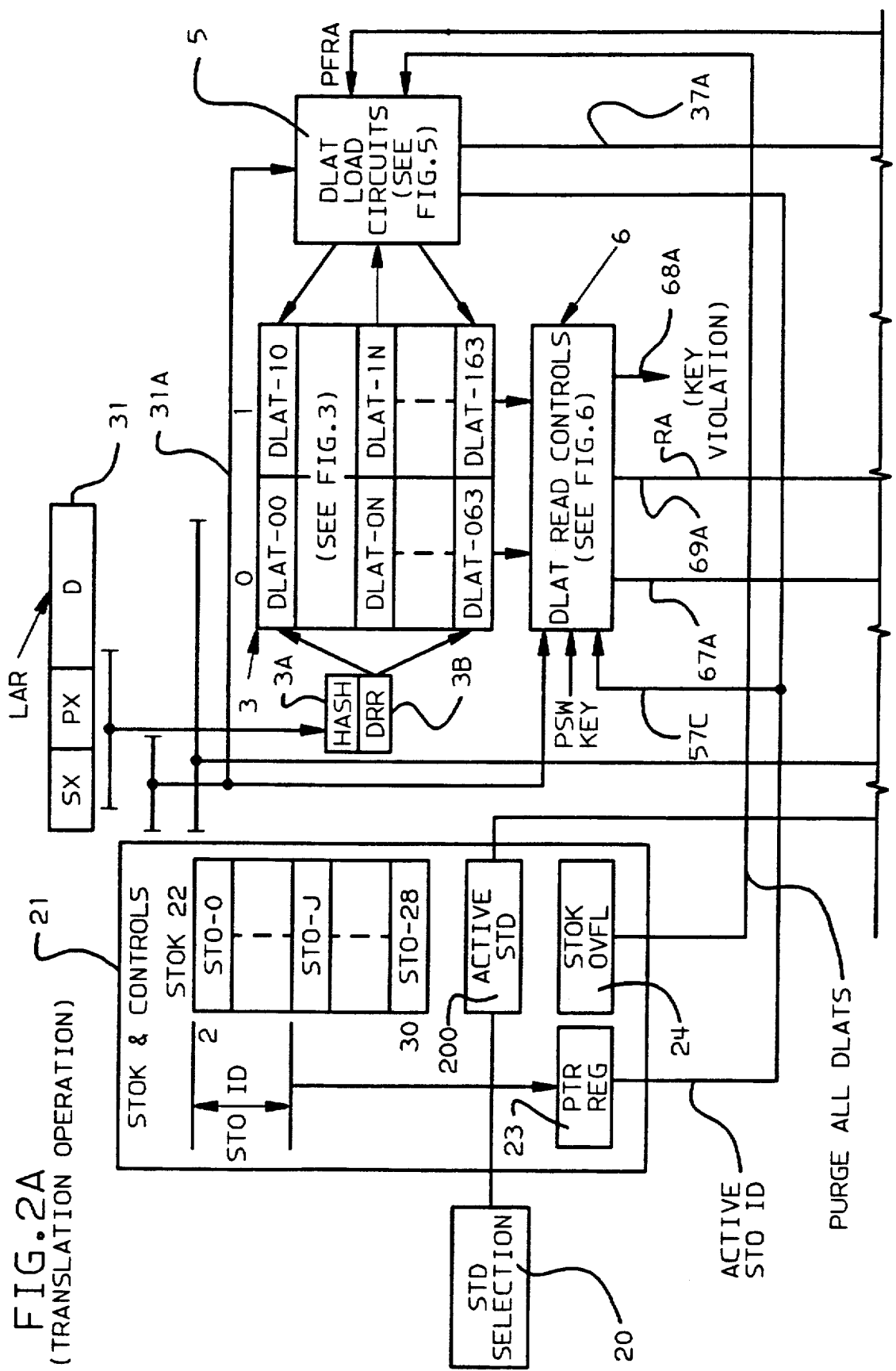
FIG. 2A (TRANSLATION OPERATION)

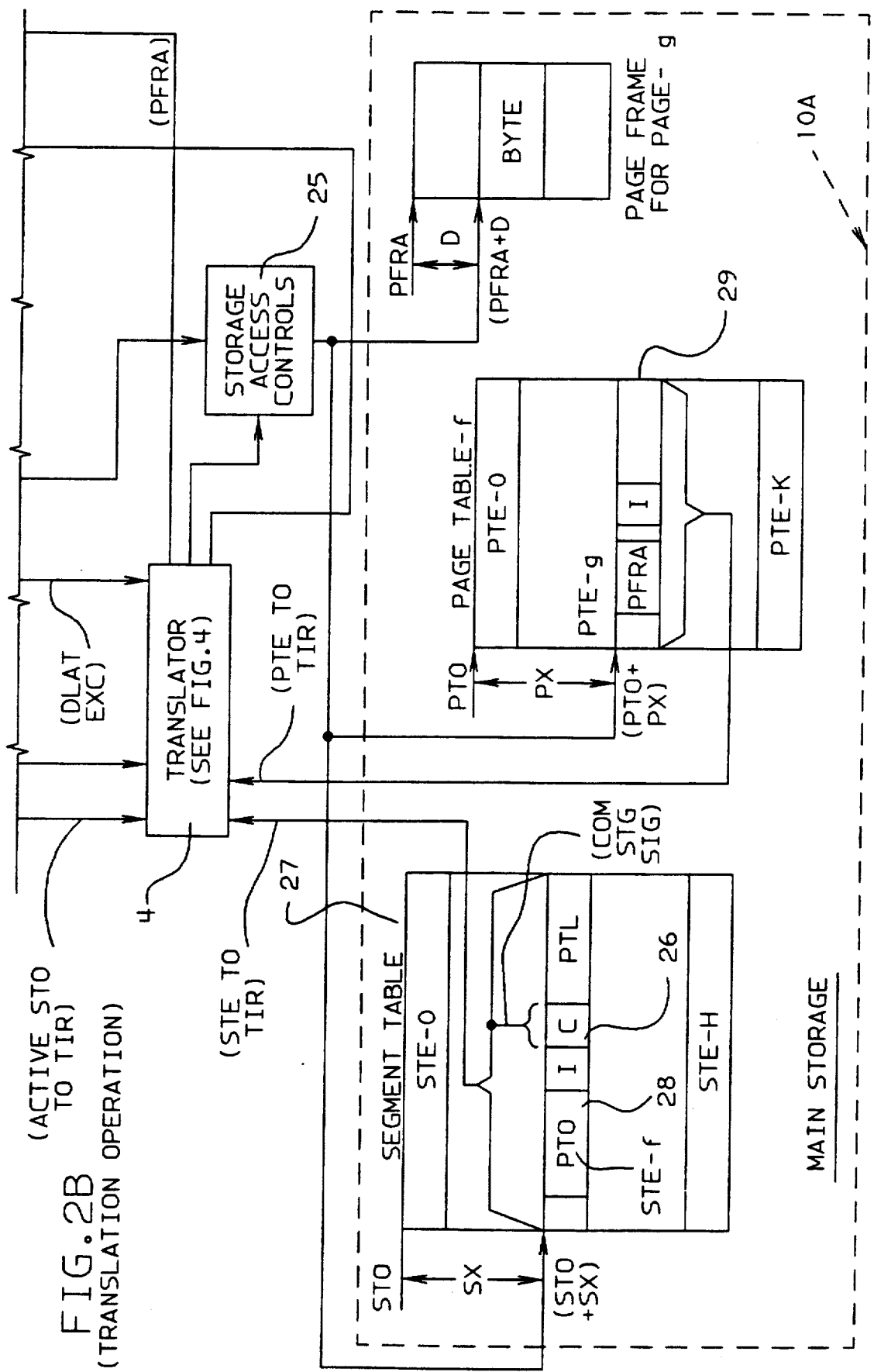

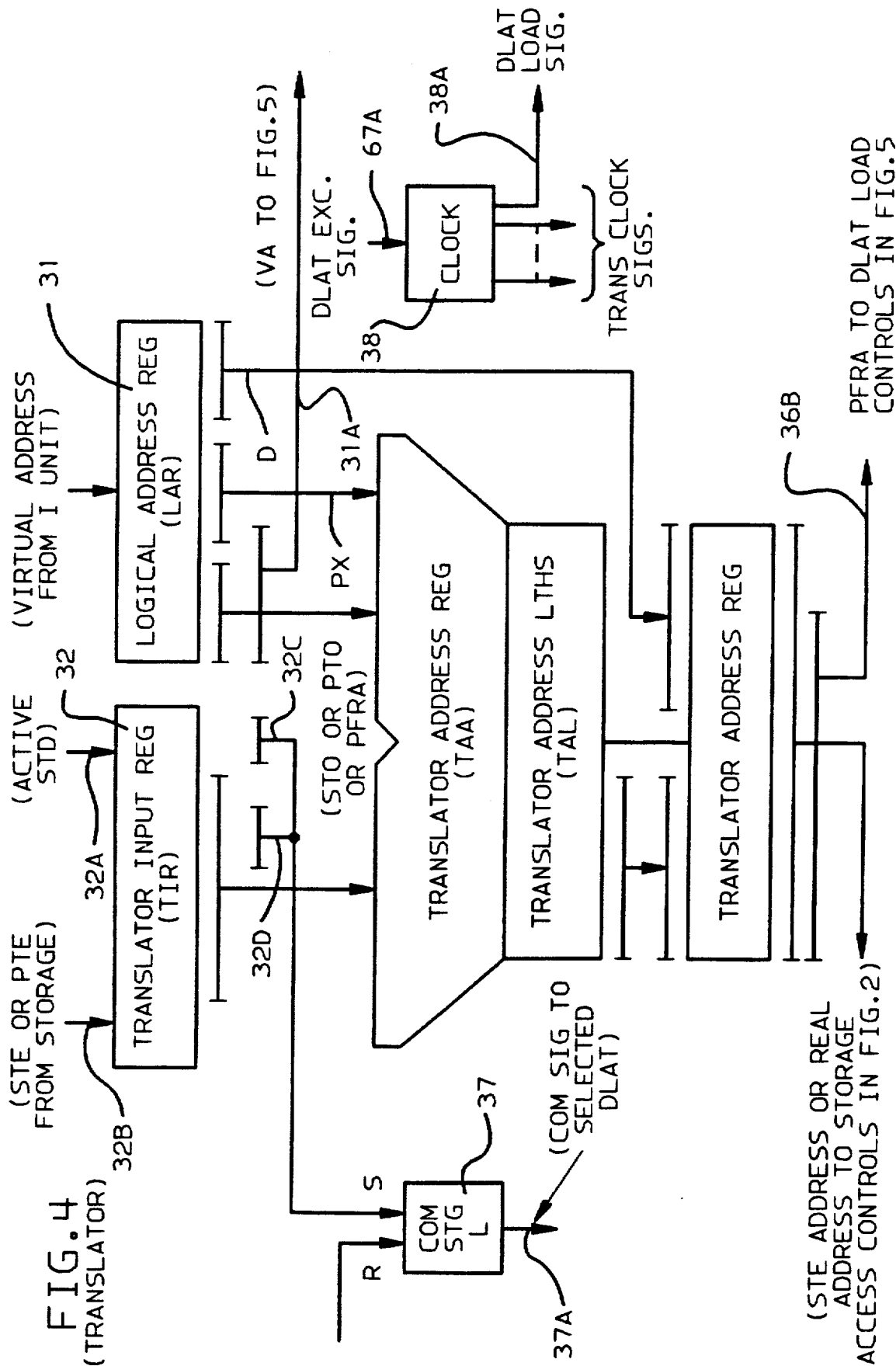

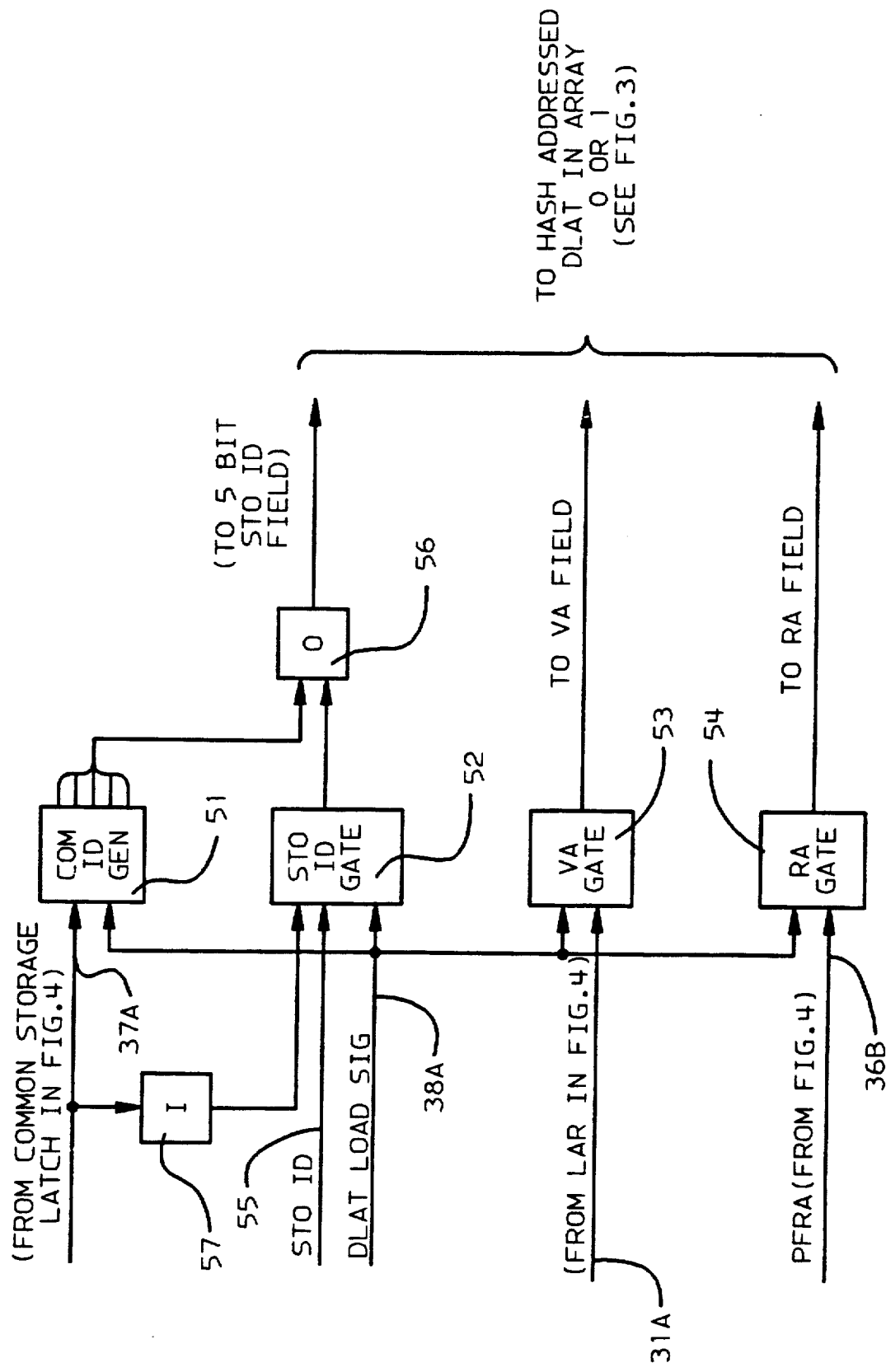

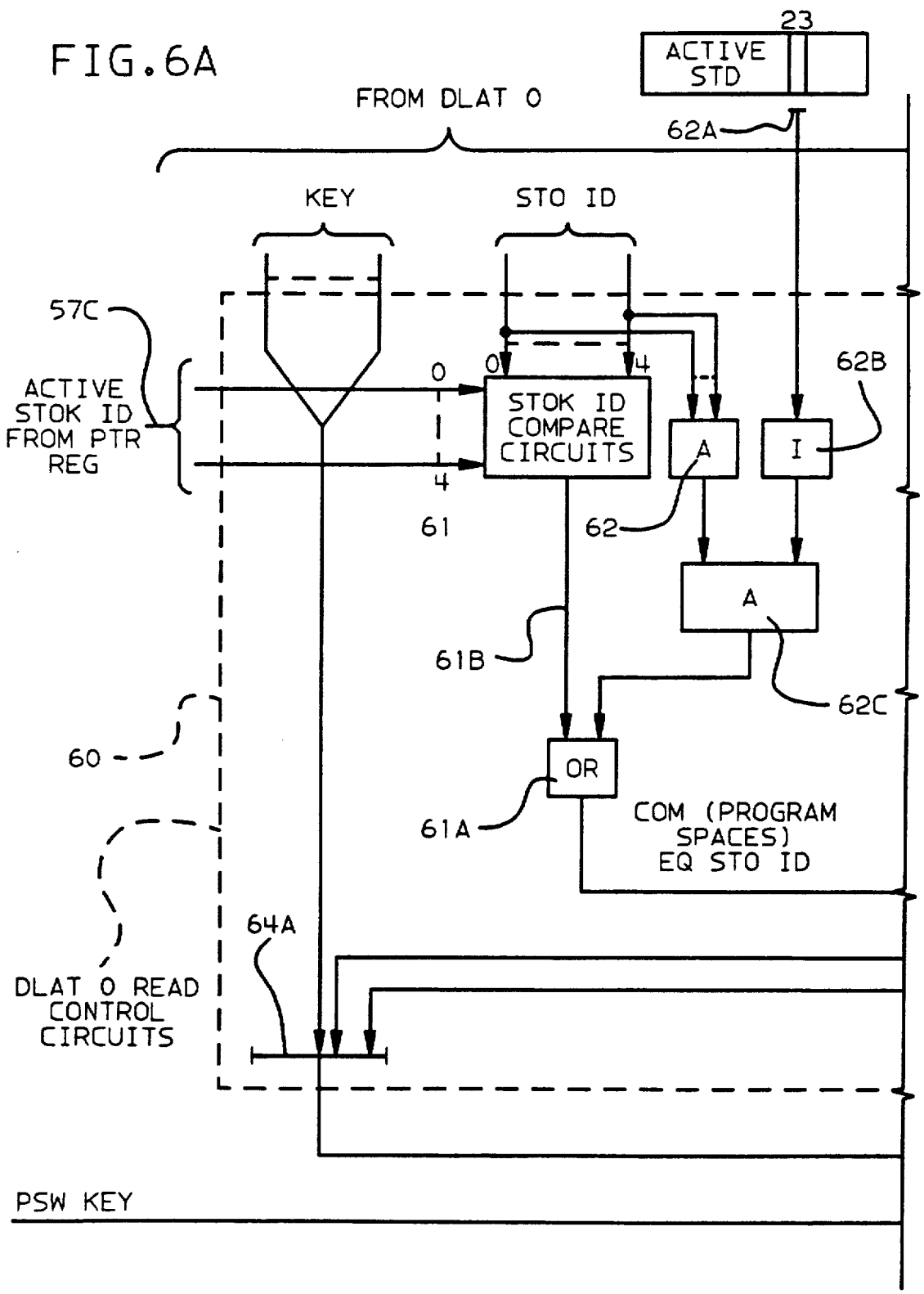

CONTROL MECHANISM FOR ZERO-ORIGIN DATA SPACES

CROSS REFERENCE TO RELATED APPLICATIONS

This application contains subject matter which is related to the subject matter of the following application filed on even date herewith and assigned to the same assignee:

"Access Register Translation Means for Address Generating Mechanism for Multiple Virtual Spaces", by R. I. Baum, et al., Ser. No. (07/154,689). This copending application is incorporated by reference herein.

FIELD OF THE INVENTION

The invention relates to a mechanism for having concurrently available to an operating system and programs executing under the control of that operating system, two distinct types of virtual address spaces: one, called herein a program address space consisting of both private and common address ranges, and one, called herein a data address space, or data space, consisting of only private address ranges.

DESCRIPTION OF THE PRIOR ART

Data processing systems using virtual addressing in multiple virtual address spaces are well known, such as the IBM System/370 systems using MVS and MVS/XA system control programming. Such systems define each address space as having linear addressability from 0 to $(2^{}31-1)$ bytes using segment tables, in which each entry contains the address of a page table, and page tables in which each page table defines a plurality of page entries in the address space. Each page entry may contain the address of any assigned page frame in main storage. Each address space is referred to by a pointer called a segment table origin (STO) which locates the address space segment table in storage. In current System/370 architecture, each address space has up to 2 gigabytes $(2^{}31)$ of linear virtual addressability beginning at address zero. In current System/370 MVS/XA operation, an essentially unlimited number of address spaces are available; different address spaces are assigned to different users of the system, and the address spaces obtain isolation between the users of the system, i.e., one user can only address within his own address space and is isolated from the address spaces of the other users, with certain exceptions: the exceptions are (1) when an address space, or a part thereof, is defined in common among all users (in which case optimization of usage of a Directory lookaside table translation lookaside buffer (DLAT, or TLB) can be achieved by inventions such as those shown in U.S. Pat. No. 4,096,573 entitled "DLAT Synonym Control Means for Common Portions of All Address Spaces" to A. R. Heller et al., and U.S. Pat. No. 4,136,385 entitled "Synonym Control Means for Multiple Virtual Storage Systems" to P. M. Gannon et al., both assigned to the same assignee as the present application); and (2) when multiple address spaces are addressable from a given address space (mechanisms for which are defined in U.S. Pat. No. 4,355,355 entitled "Address Generating Mechanism for Multiple Virtual Spaces" to J. R. Butwell et al., and 4,521,846 entitled "Mechanism for Accessing Multiple Virtual Address Spaces" to C. A. Scalzi et al., both also assigned to the assignee of the present application; and U.S. Pat. Nos. 4,366,537, 4,430,705, and 4,500,952, all also assigned to the assignee of the present invention, which deal with a dual address space (DAS) facility).

In both of these cases, the structure of address spaces is fixed with respect to a particular control program: that is, in case (1), address ranges designated as common are common to all defined address spaces, and so all such address spaces can gain in performance from the DLAT synonym control inventions cited above for addresses falling within common segments; likewise, in case (2), the basic address space structure of all defined address spaces is fixed, and so, again, those same inventions can be used to eliminate synonym table entries for addresses within the designated common range within a translation lookaside buffer.

A failure of the prior art, however, lay in the fact that the invention, and its associated performance benefit, required that common segments be common to all defined address spaces. The invention of the Gannon patent noted earlier (U.S. Pat. No. 4,136,385) must be enhanced to allow for the existence of both address spaces sharing common segments, and data spaces without segments in common (without this enhancement, any attempt to employ the Gannon invention in an environment where data spaces and program spaces co-exist would result in occasional instances of real addresses within common segments of program spaces being returned by the DAT process, where the real address within a data space's private segment was desired). There are cases where it is desirable, for purposes of, e.g., data isolation, to associate data with individual address spaces - where the predefined common address ranges cannot be used for this data, so that the amount of data that may be mapped into a particular address space is limited to that portion of the virtual addressing range not dedicated to "common" addresses; further, since (for historical reasons) common areas within the MVS/XA addressing range are not all contiguous, large blocks of data within an address space must be fragmented to avoid the common address segments. Finally, a system 370 feature called "low Address Protection" (see, e.g., IBM System/370 Extended Architecture Principles of Operation, SA22-7085) prevents the first 512 bytes of an address space's addressing range from being stored into when the feature is active. This further limits the availability of address spaces for data storage.

SUMMARY OF THE INVENTION

The present invention facilitates the utilization within data processing systems of logical constructs called data spaces for holding data to be accessed from programs executing in address spaces. Central to this invention is a mechanism which permits the full addressing range of the machine (from 0 to 2 gigabytes in the MVS/XA system described) to be used for accessing data contiguously, without the reservation of common areas that is part of the definition of a program address space (e.g. in such a program address space, the first 512 bytes are designated as the Program Storage Area, or PSA, and are not usable for storing private data).

In order to allow this usage of the full addressing range in a data space, the invention provides a means whereby a previously resolved virtual address within a common range for a program address space, located in a translation lookaside buffer, will not be used in error for translating an identical virtual address within a data space. The invention also provides a mechanism for accessing the data space from within a program space, for overriding low address protection for store operations into data spaces, and a method for mapping data into the data space.

It is a primary object of this invention to permit large data objects (up to 2 gigabytes) to be mapped into virtual data spaces, without fragmentation because of common segments appearing within different address ranges of the address space.

It is a further object of this invention to permit the above mapping to take place in certain data spaces defined to an operating system which data spaces have no segments in common with other data or program spaces, while other program address spaces do have common segments that they share with similar address program spaces.

It is still a further object of this invention to permit improved processor efficiency by eliminating duplicate entries within a translation lookaside buffer for virtual addresses within shared segments for address spaces that have shared segments, while recognizing that such entries may not be shared for address spaces that have no such shared segments.

It is another object of this invention to allow the use of data address spaces, directly accessible by programs executing in other address spaces, to facilitate the isolation and restricted sharing of data objects.

It is another object of this invention to allow the use of all addresses within the possible virtual addressing range of an address space, beginning at virtual address zero, for user data.

BRIEF DESCRIPTION OF THE DRAWINGS

FIGS. 2A and 2B comprise a block diagram showing the process of translation of virtual to real (main storage) addresses, making use of lookaside tables.

FIG. 4 is a block diagram showing details of a translator used in the embodiment.

FIG. 5 is a block diagram showing the DLAT load controls used in the embodiment.

FIG. 6A and 6B comprise a block diagram showing in detail the logic required by this invention to determine whether real addresses may be fetched from the lookaside table for given virtual addresses.

DESCRIPTION OF THE PREFERRED EMBODIMENT

The zero-origin data space of the current invention is a logical construct whose existence and practical usage is made possible by a related set of facilities: (1) A common-segment override facility, and low address protect avoidance mechanism, both central to this application; (2) a mechanism for accessing data within the virtual address range of a data space from within the virtual address range of a program address space; and (3) means for associating logically contiguous blocks of data residing on an external medium with a data space in a way that allows the data to be readily used by an executing user program without explicit I/0 program steps in that user program.

1. Common-segment Override & Low-Address Protect Avoidance Facility

Figure 1A:
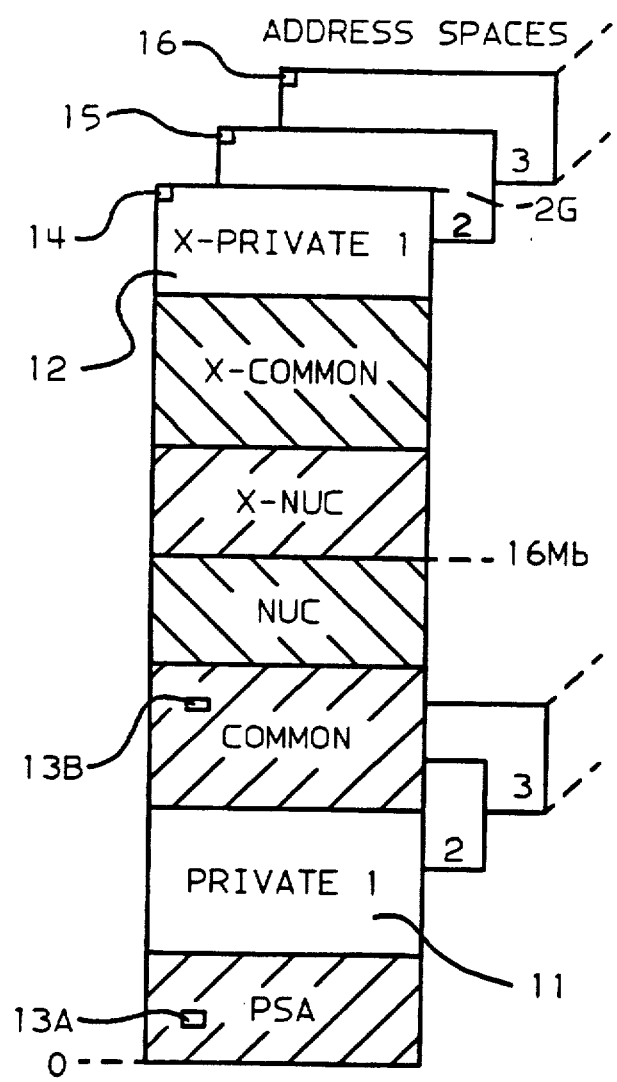
FIG. 1A is a schematic diagram of the structure of an MVS/XA address space of the prior art, containing common segments.

FIG. 1A illustrates the structure of a typical MVS/XA program address space. The shaded areas are "common" to all program address spaces—there is only one logical version of these common areas, so that a change made to a common area of storage is immediately reflected in all program address spaces, since all share the same common storage. Data which is placed into a program address space, which is to be isolated from other programs, must be placed into one of the private areas (11, 12) which, being logically disjoint, cannot accommodate extremely large data sets without fragmentation.

Figure 1B:
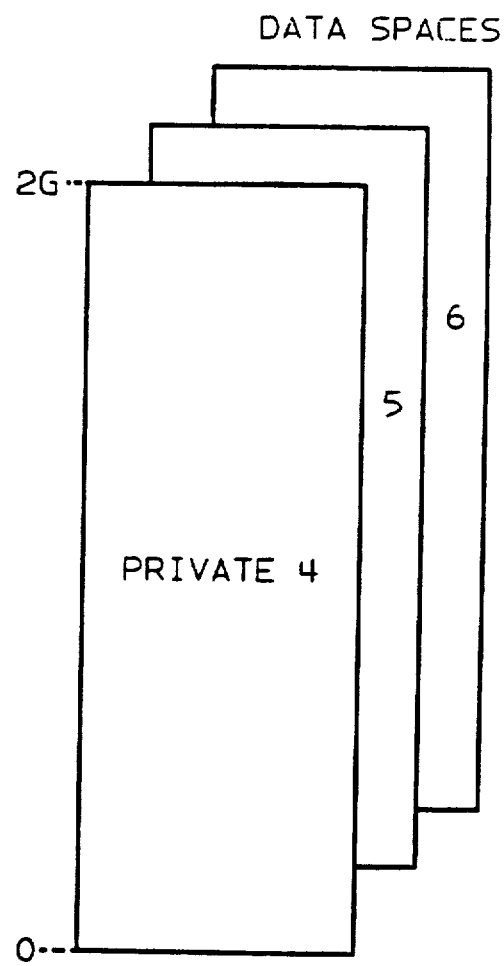
FIG. 1B is a schematic diagram of the structure of the data space of this invention, which does not contain common segments.

FIG. 1B illustrates the "data space" of the present invention. It is distinguished from a program address space by an indicator bit in an associated segment table descriptor (62A, FIG. 6). The absence of shaded areas in FIG. 1B indicates that no areas of such a data space are common either to other data spaces, or to any program address space. To illustrate, a virtual address referring to a storage element within common storage in a program space (13A & 13B) denotes an element whose content is the same viewed from any program space; therefore virtual addresses for all storage within common segments within program spaces are resolved to the same set of page tables (71, FIG. 7). On the other hand, a virtual address referring to a storage element in private storage (14, 15, 16) is resolved to a unique page table (72, 73). The process of resolving a virtual address into a corresponding real (main storage) address (where the virtual address represents an element that currently resides in real storage) is called dynamic address translation (DAT), and is well known in the prior art (see, e.g., IBM System/370 Extended Architecture Principles of Operation, Publication No. SA22-7085). For performance reasons, a translated virtual address, and its corresponding real address, is maintained for a time in a translation lookaside buffer (TLB, or DLAT), where it can be used to avoid the overhead of retranslating a virtual address previously translated for an address space. Additional performance benefit is gained by recognizing that a previously translated virtual address even within a different address space will be resolved to the same real address where both virtual addresses are the same, and both fall within a common segment (in this case, the virtual addresses, identical except that they occur within common segments of different address spaces, are termed "synonyms").

FIGS. 2A and 2B illustrate a block diagram of a general framework in which the preferred embodiment may operate based on the invention of U.S. Pat. No. 4,136,385 referenced above (FIG. 6A contains the detailed logic of the common segment override portion of the invention claimed here). A STOK and controls 21 has an active control register which contains the active segment table origin (STO) currently being used by the processor virtual address currently loaded into a logical address register (LAR) 31, which is currently requesting the address to be accessed. Controls 21 also contain a segment table origin stack (STOK) 22 which has 15 entries which sequentially receive each active STO when it is loaded into the active control register. The program address spaces and data spaces represented by the STO's in STOK are the only address spaces which are represented currently by the entries in DLAT 3. Each entry in the STOK has an index value of 2 through 30. These index values are used as a STO identifier (STO ID). The currently active STO in STOK is located by the STO ID in a pointer register (PTR REG) 23. The STO ID currently in pointer register 23 locates the STOK entry having the same STO as the STO contained currently in the active control register. The reason why STO ID's 2 through 30 are only used is to accommodate an index size of five binary bits providing values 0-31, of which the values 0, 1 and 31 are used in the DLAT's to indicate the special conditions of invalid STO, no dynamic address translation (NON-DAT mode) and common storage, respectively. The latter value provides a DLAT indication that it addresses a page shareable by all address spaces. A larger STOK with more STO IDs could be provided for example, by having a six bit STO ID support 61 STOK entries ($2^6-3$), etc.

In FIG. 2A, box 24 signals an overflow condition for STOK 22 when all entries 2 through 30 are filled and another STO is to be entered into the STOK. Circuit 24 generates the overflow signal when STO ID 30 is in PTR REG 23 and a next active STO in the active control register is not found by a search of STOK entries 2 through 30. The overflow output signal from circuit 24 is transferred to DLAT load circuits 5 to reset all DLAT entries. Note that other implementations may not require this broadside invalidation technique.

DLAT 3 in FIG. 2A is a two-way set associative, in which half of the DLAT array contains DLAT table 0 having 64 entries designated as 00 through 063, and the other half of the DLAT array is designated as DLAT table 1 containing 64 entries designated as 10 through 163. DRR register 3B contains the address of the currently selected pair of DLAT entries. The address in DRR 3B is derived by hash circuits 3A hashing bits of the virtual address in LAR 31.

Figure 3:
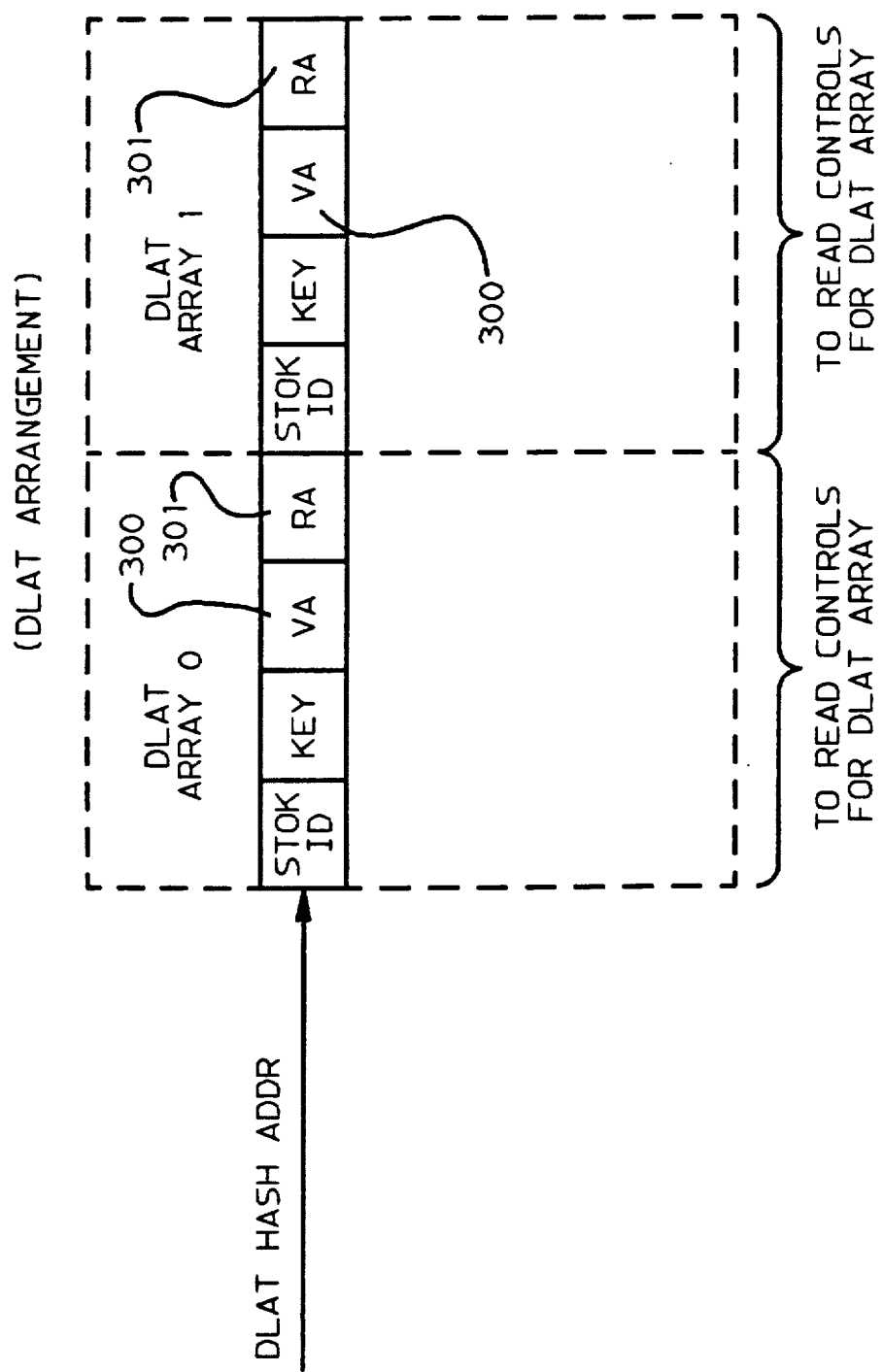
FIG. 3 is a schematic diagram of the format for each pair of associated DLAT entries accessed by a single DLAT hashed address.

FIG. 3 illustrates the format for the pair of selected entries being addressed by the DRR register. It is seen therein that each entry contains a STO ID derived from either (1) pointer register 23, or (2) from a common space bit C 26 in the segment table entry (STE) accessed for translation of the DLAT entry.

Continuing in FIG. 2, the translation of the virtual address in LAR 31 is conventionally done by a translator 4 in which the SX component of the address indexes the STE entries from the STO ADDRESS of the segment table 27 in FIG. 2B, which STE address is STO plus SX. The page table origin (PTO) address 28 is in the accessed STE and is used by the translator to address the page table entry (PTE), shown as PTE-g 29 in FIG. 2B. PTE-g is addressed therein at the location PTO plus PX. The real or absolute address of the page to be accessed is contained in the PFRA 29 component of the accessed PTE, which is then transferred by translator 4 to the load controls 5 and put into the absolute address (RA) 301 field in the selected DLAT.

When bit C26 in the STE format is set to 1, the segment table entry is thereby indicated to represent a common space segment (i.e. shared segment) represented by all pages in the page table accessed by means of STE. However, when bit C is off, the STE defines a private segment, i.e. not accessible by any other address space than that defined by the STO which addresses the particular segment table.

In FIG. 3, the virtual address (VA) field 300 in the selected DLAT entry also receives bits from the VA in LAR 31 of FIG. 2A in order to distinguish this page VA in the DLAT from all other page VA's represented in other DLAT entries, in which the hashed address always is part of the distinguishing characteristic for the virtual addresses represented in the DLAT. The key received in the DLAT entries is the storage protect key for the page.

A DLAT loading operation occurs whenever the processor transfers an address into LAR 31 of FIG. 2A, and the read controls find that no DLAT entry addresses the page required by the address in LAR 31. The lack of such DLAT entry is indicated by DLAT read controls 6 in FIG. 2A providing a DLAT exception signal on line 67A to translator 4. Translator 4 converts this signal by a clock mechanism to DLAT load signal 38A. DLAT read controls 6 simultaneously compare all of the pertinent fields in each of the pair of selected DLAT entries being hash addressed by the DRR 3B with corresponding fields comprising the VA bits in LAR 31, the STO ID being provided from pointer register 23, and the key field provided by the program status word (PSW). If equality is found for one of the two DLAT entries 0, 1 respectively being simultaneously compared in the DLAT read controls 6, the read controls select only that DLAT having all pertinent fields equal. The selected DLAT entry then causes controls 6 to output a page frame address (RA) as a signal on line 69A to storage access controls 25 to initiate the access of one or more bytes beginning at that RA address obtained from the selected DLAT entry by concatenating it with the displacement (D) obtained from LAR 31.

However, the DLAT read controls 6 may note that a common storage indicator value of binary 31 exists in the STO ID field of the selected DLAT entry, in which case, only for address spaces as known in the prior art, but not for data spaces as defined by this invention, the DLAT read controls 6 ignore the non-equal compare due to the STO ID value 31 by forcing it to act like an equal STO ID compare for all STO ID values. Then the access of the virtual address in LAR 31 is permitted, regardless of which address space is making the request (indicated by pointer reg 23).

Accordingly, it is thereby realized that the STO ID field in the DLAT is loaded with a value that controls whether the DLAT entry is permitted to be used by only the address space which loaded it, or by all address spaces regardless of which address space loaded it.

Translator 4

The translator inputs comprise logical address register (LAR) 31, which is also represented in FIG. 2, and translator input register (TIR) 32. LAR 31 receives the virtual addresses from the instruction unit of the processor, and TIR 32 receives the STOs from the active STD control register and the STEs and PTEs from main storage, one at a time. The state of the common space bit C in an STE is sensed by outgate 32C, which senses bit position 30 in the TIR 32. Outgate 32C is connected to the set input of common storage latch 37 and sets it on if bit C is on, and sets the latch off if bit C is off. Output lead 37A provides the latch setting to the DLAT load controls 5, which then generate and load the common storage value 31 into the STO ID of a currently selected DLAT entry, if the common space bit C is on. If the common space bit C is off, then the latch 37 is set off, and line 37A will signal controls 5 to load the STO ID being provided from pointer register 23 into the selected DLAT.

The output of translator 4 provides the addresses STO+SX, or PTO+PX, as required to access the STEs and PTEs, respectively. The PFRA+D value is not generated by the translator but is obtained by concatenation of the RA from the selected DLAT and the D value from the LAR 31 which concatenation is directly done by the storage access controls 25 in FIG. 2 in order to obtain faster generation of byte addresses in a page currently available by means of a DLAT entry.

A clock 38 controls the timing involved in the translator circuitry. The clock is actuated by a DLAT exception signal on line 67A from the DLAT read controls 6. When no DLAT entry is found, the clock completes its operation by providing a DLAT load signal on line 38A which signals that the PFRA has been provided from the PTE and is not available for loading into the selected DLAT entry.

DLAT Load Controls 5

The DLAT load controls in FIG. 5 comprise a plurality of gates which load the various fields in the selected DLAT entry. Conventional LRU circuits (not shown) select one of the pair of DLAT entries addressed by DRR 3B of FIG. 2A. In FIG. 5, the common ID generator 51 is an AND gate which receives the common space signal on line 37A and the DLAT load signals on line 38A. When activated, generator 51 provides its output as one bits on five lines to represent the binary value 31. These lines are provided through an OR circuit 56 to the STO ID field in the selected DLAT entry.

Also, line 37A connects the common space signal from latch 37 (FIG. 4) to an inverter 57 which output disables a STO ID gate 52 to inhibit the active STO ID from being passed from line 55 from the pointer register to OR circuit 56. Therefore, when common bit C is on, the only output from OR circuit 56 is the value 31 indicating the common ID for the selected DLAT.

If the common space bit is off, there will be no output from generator 51, and inverter 57 will be activating gate 52; in which case the STO ID on lines 55 will be outputted through OR circuit 56 to the five bit STO ID field in the selected DLAT entry.

VA gate 93 will be gating the LAR bits 8-14 on line 31A to the VA field in the selected DLAT to provide the VA identification. Likewise, the RA gate 94 will be passing the PFRA on line 36B to the RA field in the selected DLAT.

DLAT Read Controls 6A and 6B

Figure 6B:
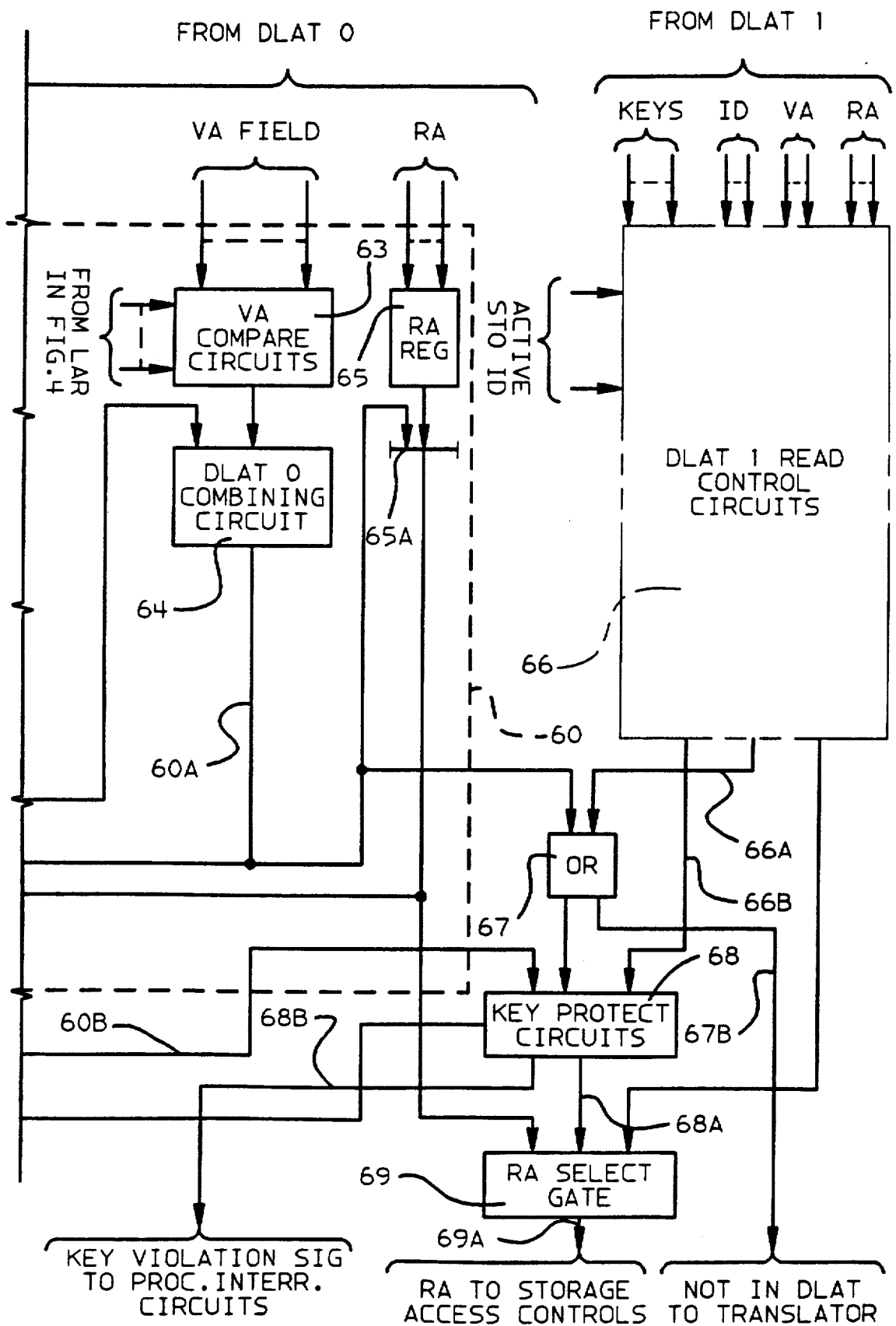
Figure 7:
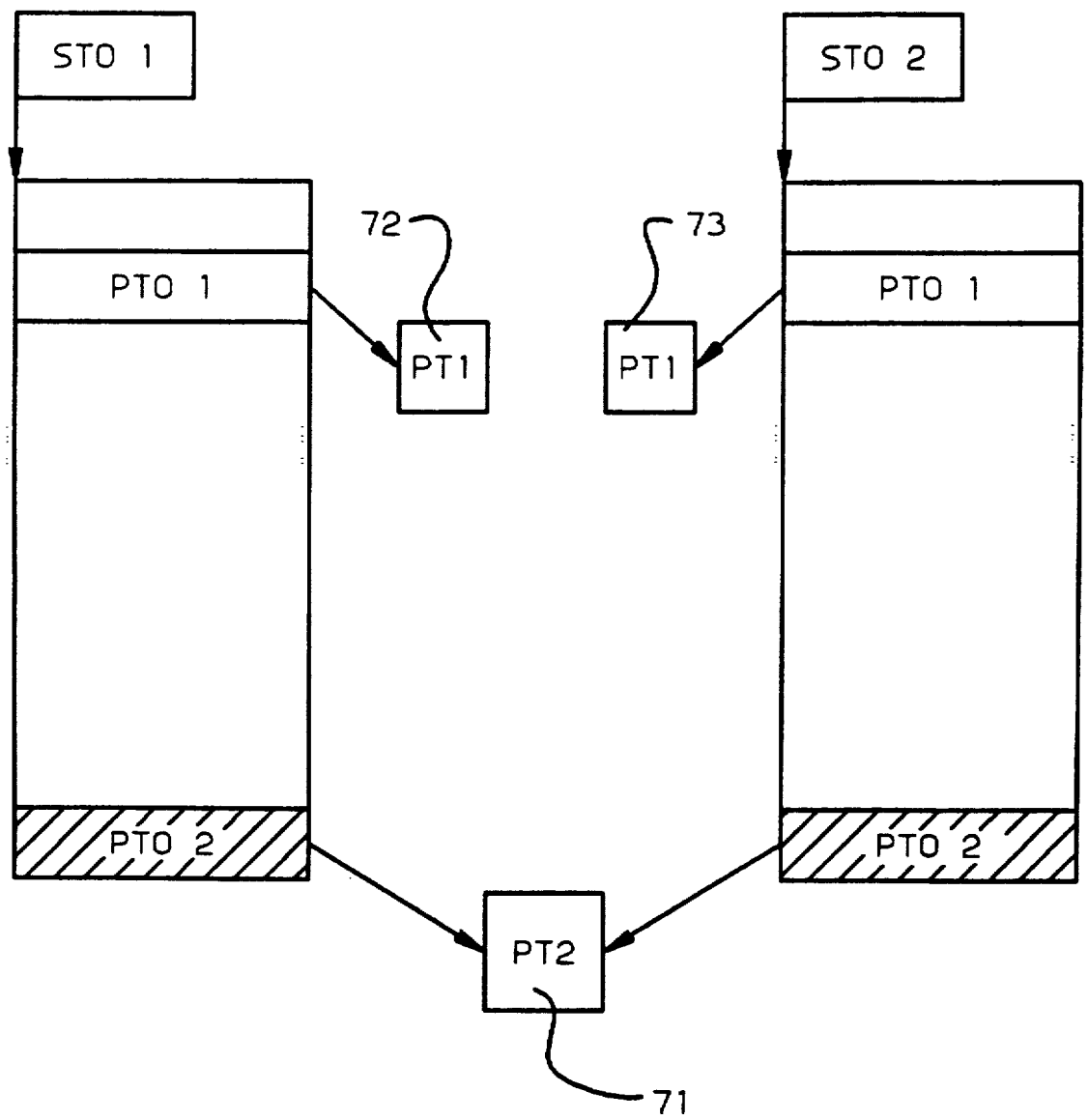
FIG. 7 is a schematic diagram illustrating the mapping of segments to page tables.

The DLAT Read Controls shown in FIGS. 6A and 6B contain logic for distinguishing program address spaces from data spaces, triggered by a data space indicator bit 62A in the STD. These controls include two identical DLAT read control circuits 60 and 66, which respectively receive the pair of selected DLAT entries in DLAT tables 0 and 1. Each circuit 60 and 66 includes a plurality of compare circuits. In circuit 60 for example, compare circuit 61 compares the STO ID from the selected DLAT with the active STO ID received from the pointer register 23 (in FIG. 2A) to determine if the DLAT address is in the requesting address space. If they are equal, a signal is provided on output line 61B to an OR circuit 61A. If they are unequal, no signal is provided on line 61B, and the DLATs address is not in the requesting address space. However, this invention uses a common storage detector AND circuit 62 to sense if the STO ID in the selected DLAT is the common storage indicator binary 31. Circuit 62 is an AND gate which requires that all five STO ID inputs be ones to sense the binary 31 indication and activate the output to AND circuit 62C. If the output of inverter 62B is an active output (which is the case for program address spaces, where the data space indicator 62A is inactive), a positive indication from 62 (indicating common storage) will be passed to OR circuit 61A, bypassing any unequal condition in circuit 61. If, however, data space indicator 62A is active, indicating that the STD describes a data space, as defined by this invention, this active indication will be inverted (62B), thereby inhibiting any bypassing of the STOK ID comparison 61 for data space addresses that happen to fall within the range of virtual addresses defined as common for address spaces. In summary, OR circuit 61A provides an active output if (1) the received STO ID's are equal, or (2) the address is part of an address space, not a data space, and a common ID indicator is the DLAT entry.

A VA compare circuit 63 compares the VA fields in the selected DLAT with bit positions in the LAR. If these VA fields compare equal, the DLAT translates that VA, provided that an address space resolution signal is being provided from OR circuit 61A to condition DLAT 0 combining circuit 64, which then provide an output to a gate 65A which thereby passes the main storage address (RA) received from the selected DLAT by an RA register 65. The RA is then passed to RA select gate 69 from the RA register. The outputs of gate 65A and output 60A of circuit 64 also condition a gate 64A to select the key from the DLAT entry for being inputted to key protect circuits 68.

DLAT 1 read controls 66 contain identical circuits to the DLAT 0 read controls 60 just described.

The DLAT read controls 60 and 66 (which are simultaneously receiving the outputs of both DLATs of the pair at a selected hash address) are making the decision of which DLAT entry of the pair, or neither, will be the DLAT selected by the current address request in LAR 31 and pointer register 23 of FIG. 2A. Only one of lines 60A or 66A can be active at any one time from a pair of DLAT entries, since only one of the two circuits can have the compare equal conditions required to make active the respective line. Likewise, only one of the circuits 60 or 66 can output an RA through its gate 65A. The gated RA will be provided as input to RA select gate 69, but it will not be permitted to exit from gate 69 unless the key in the selected DLAT entry is equal to the PSW key being received by key protect circuit 68. If the PSW key and DLAT key are equal, a signal is provided on line 68A to activate a RA select gate 69 to pass its received RA to the storage access controls, which will access the address in main storage. However, if the key compares unequal in circuits 68, a signal on line 68B indicates a key violation which will be provided to the processor interrupt circuits, and the access will be prevented by gate 69.

OR circuit 67 also has a complementary output 67B which indicates that neither input 60A or 66A is indicating a selection of either DLAT entry 0 or 1, in the pair. The signal on output line 67B generates a DLAT exception signal to indicate that the virtual address in LAR 31 is not represented by any current DLAT entry, and it is necessary for the translator to translate the virtual address into an absolute page address for a page which may be residing in main storage. If the page is not residing in main storage, then it must be obtained from an I/0 device or expanded storage before the translator can access it and load a DLAT entry with the address translation.

Figure 13:
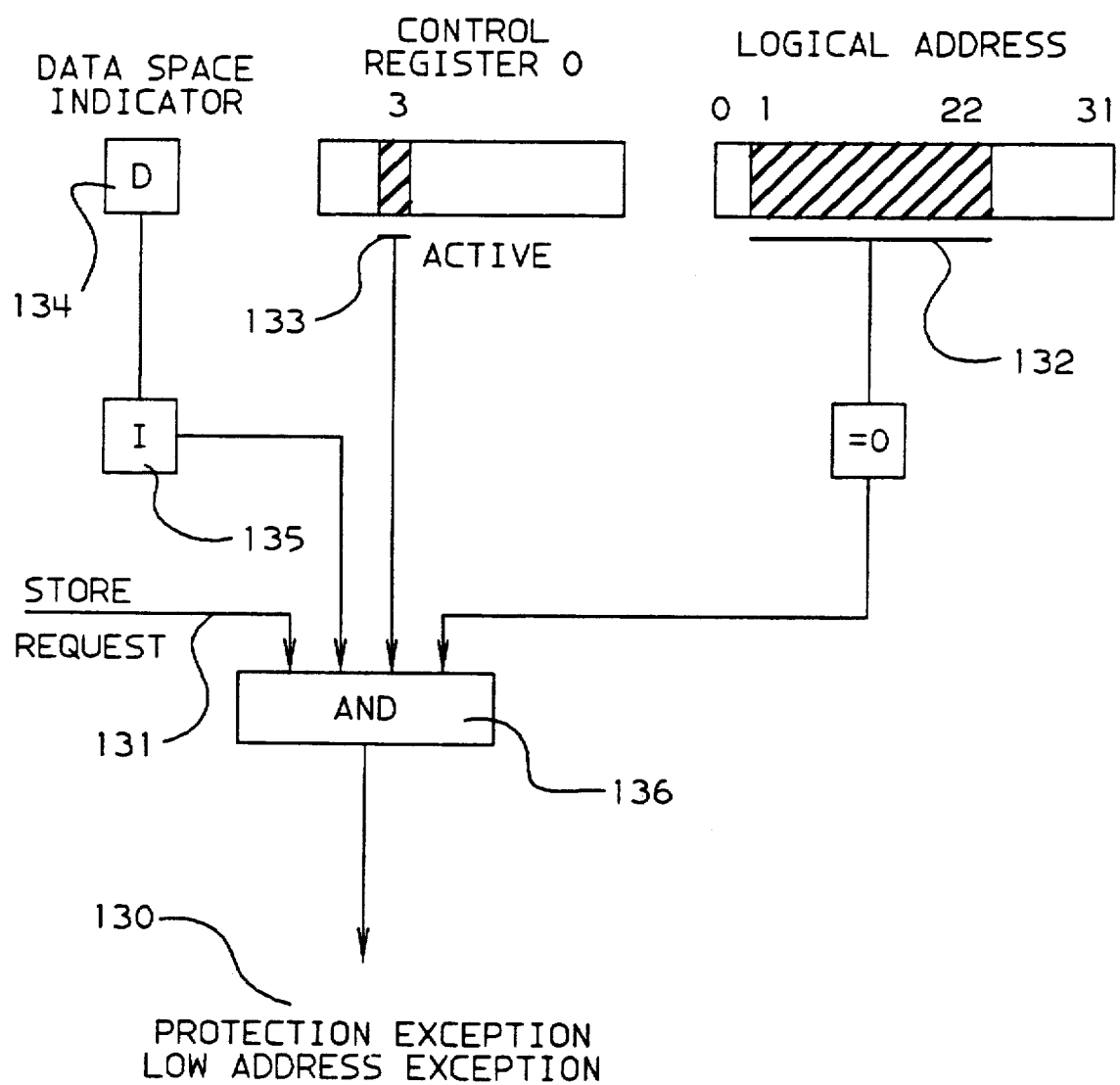
FIG. 13 is a block diagram illustrating the overriding of low address protection for data spaces.

Referring again to FIG. 1B, it shows the entire addressing range of the data space to be available for storing private data. To accomplish this, while providing for low-address protection for program address spaces, it is necessary to override this protection mechanism for store requests into data spaces. FIG. 13 illustrates how this is accomplished. A protection exception 130 is triggered when a store request 131 is issued for a logical address within address range 0-511 (indicated by bits 1-22 (132) being equal to zero), while the low address protection indicator 133 is active, and the data space indicator 134 (originating in the STD - See FIG. 6, ref 62A) is inactive (note inverter 135 will convert this inactive indication into a positive signal as input to the AND circuit 136); the protection exception is overridden when the data space indicator 134 is active, which is converted by the inverter 135 into a negative input to the AND circuit 136, thus disabling the protection exception 130.

(2) Mechanism for Accessing Data Within a Data Space From a Program Space

The value of the data space construct lies primarily in its use as a data repository - i.e., a "storage bin". To use it in this manner, a mechanism for accessing it from within a program address space is required.

Figure 8:
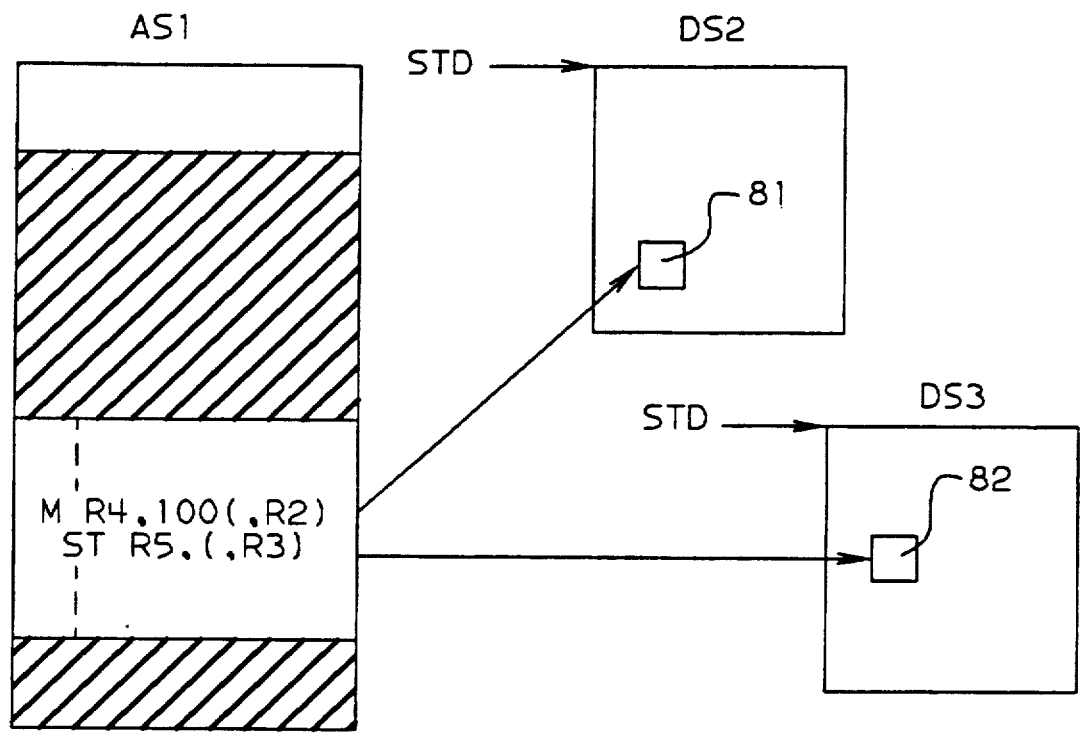
FIG. 8 is a schematic diagram illustrating the use of two data spaces by a program executing in an address space.

An example embodiment, FIG. 8, is a program executing in an address space which multiplies one operand, contained in data space 2 (81) by a second operand, contained in a register, and stores the result in data space 3 (82).

Figure 9:
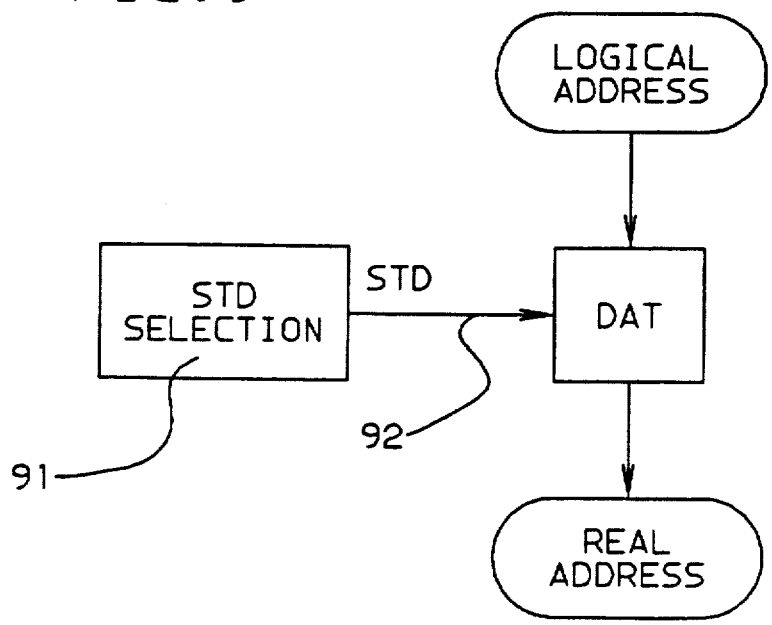
FIG. 9 is a block diagram showing the interrelationship of the STD selection mechanism and the process of dynamic address translation (DAT).

In order to accomplish this series of operations, a mechanism must be provided to associate the logical address of the second operand (contained in register 2 in the example of the multiply instruction shown in FIG. 8) with data space 2, and the logical address of the second operand of the store instruction (contained in register 3 in the example shown in FIG. 8) with data space 3. Graphically, the mechanism for performing this association is designated as "STD selection" (91) in FIG. 9, to indicate that the mechanism must produce a segment table descriptor (STD) associated with the appropriate data space. Many such mechanisms are possible—for example, such a mechanism is provided in the Butwell and Scalzi U.S. Pat. Nos. referenced above (#4,355,355 and 4,521,846) and is assigned to the assignee of the present invention. Another such mechanism is disclosed in the co-pending invention entitled "Access Register Translation Means for Address Generating Mechanism for Multiple Virtual Spaces" by R. I. Baum et al., (Docket No. PO9-87-004) filed on even date herewith, and assigned to the same assignee. The segment table descriptor, once produced, is input (92) to the Dynamic Address Translation (DAT) process.

Figure 10:
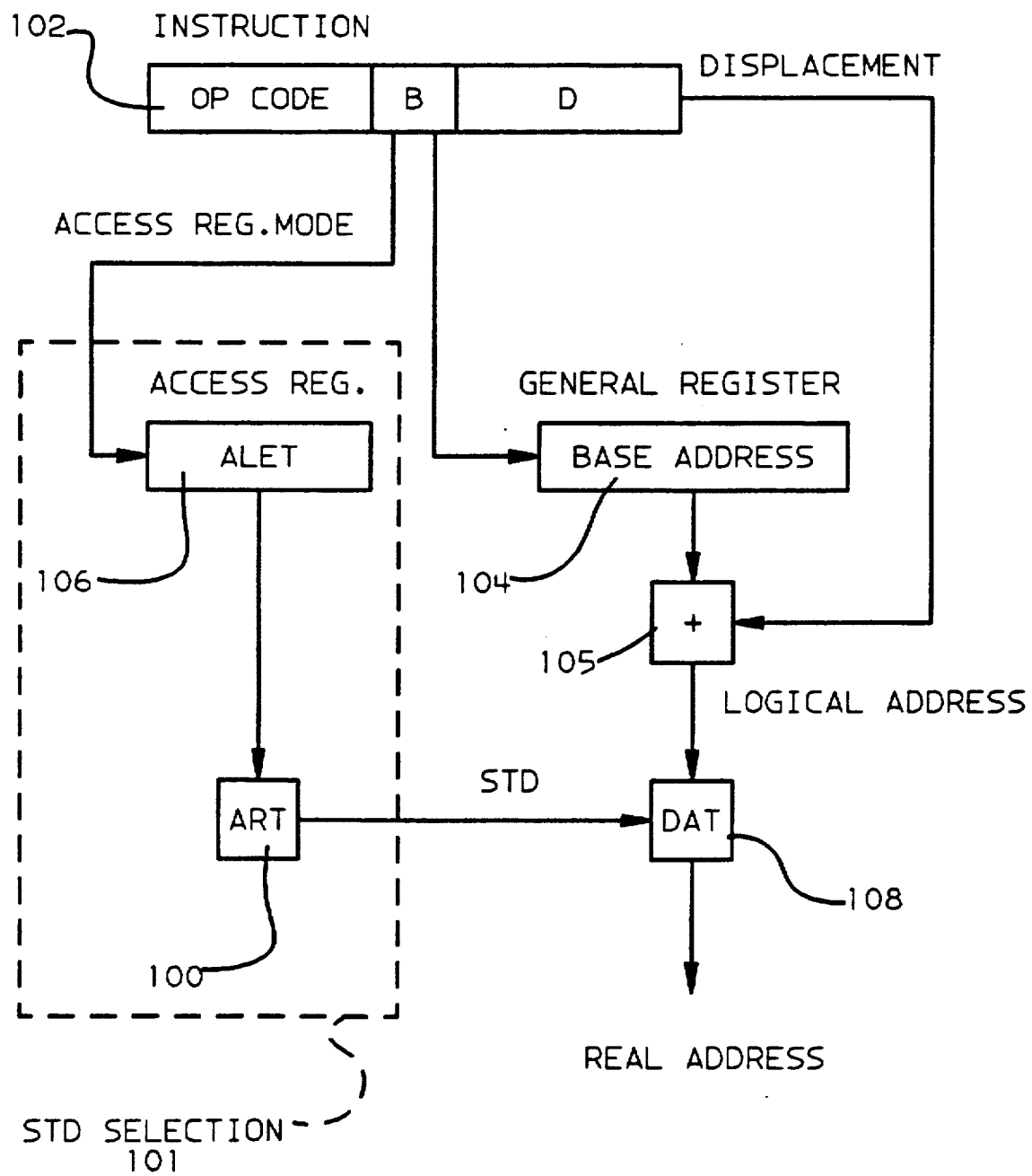
FIG. 10 is a schematic diagram illustrating the use of an access register in addressing operands.

FIG. 10 shows the STD selection mechanism (101) according to the above-mentioned co-pending invention in addressing operands. The process of using the contents of an access register to obtain a STD for use in a dynamic address translation, is called an access-register-translation (ART) operation, which is generally designated at 100. (Note that this operation is shown at 20 in FIG. 2.) An instruction 102 has an operation code, a B field which designates a general register 104 containing a base address, and a displacement D, which, when joined with the base address of general register 104 by an adder 105, forms a logical address of a storage operand. In the access register mode, the B field also designates an access register 106 which contains an ALET which, when translated at ART 100, provides the STD for the address space in which the data is stored. The STD from the ART 100 may be joined with the logical address from the adder 105, and, when translated together in the dynamic address translation (DAT) operation, designated generally at 108 (and described in more detail in FIG. 4), provides the real address of the operand for use by the system. In addition to the B field and displacement D shown in FIG. 10, an R field may be used for designating a general register containing a logical address of a storage operand.

Figure 11:
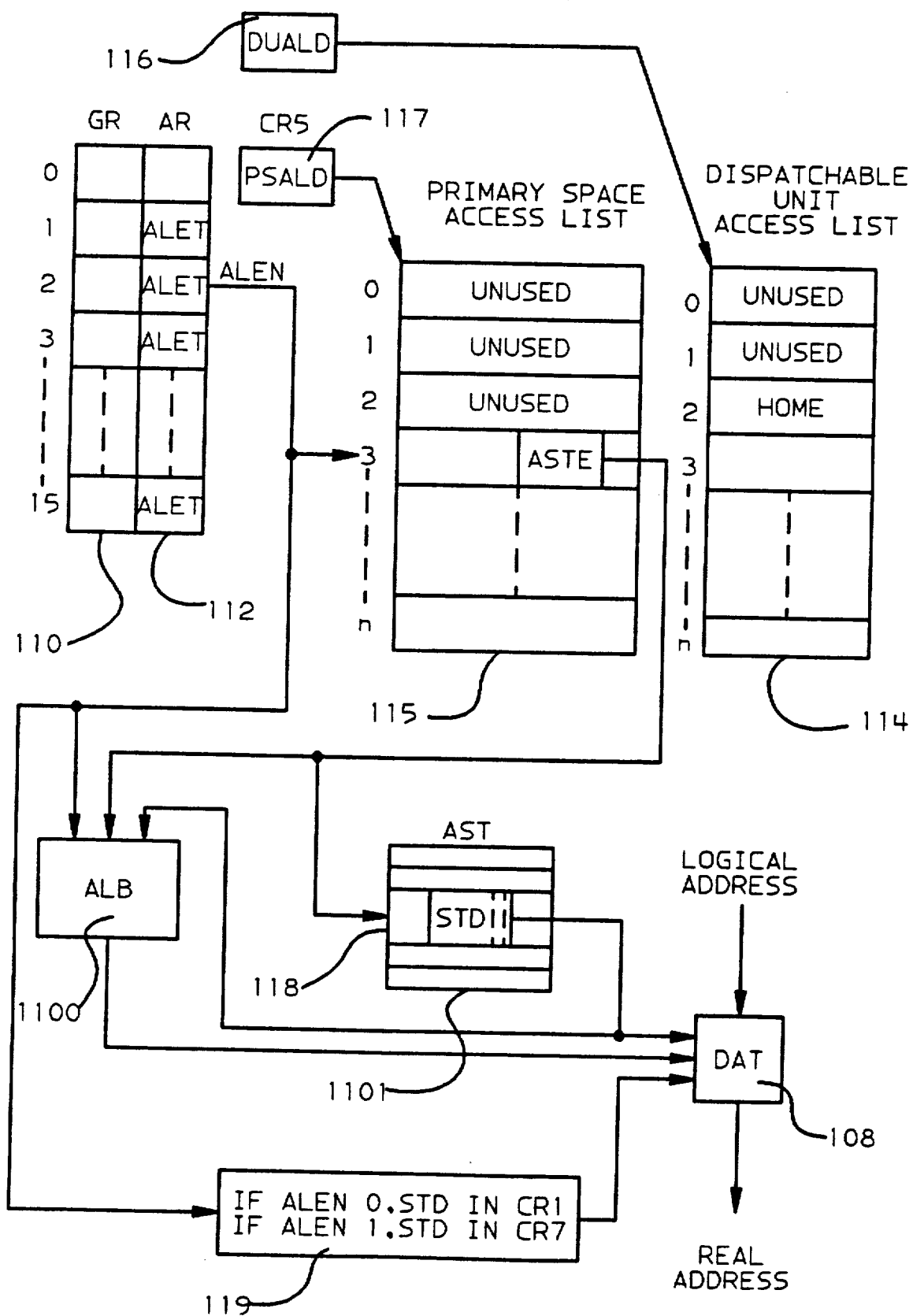
FIG. 11 is a schematic diagram illustrating an access register translation of contents of an access register of FIG. 10.

FIG. 11 provides an overview showing the translation of an ALET to a real address. Shown at 110 is an array of general registers numbered 0 through 15. An array 112 of access registers, also numbered 0 through 15, are arranged such that each access register is paired with a respective one of the general registers of array 110, as previously described in connection with FIG. 10. An access-list entry number (ALEN) in the ALET selects an entry in one of the access lists 114 or 115. Access list 114 is the DUAL, and access list 115 is the PSAL. In the example of FIG. 11 the ALEN of access register 2 points to entry 3 of the PSAL 115. The origin of the DUAL is specified by a dispatchable-unit-access-list designation (DUALD) 116 which is found by decoding an entry in control register 2, as will be explained. The origin of the PSAL is specified by a primary-space-access-list designation (PSALD) 117 which is found by decoding an entry in control register 5, as will be explained. The access-list designation used in the ART is known as the effective access-list designation (ALD).

Each entry in the access list includes an ASTE address which points to an ASN second table ASTE 118 which may or may not be in an ASN second table (AST) 1101. An ASTE may be created and perform its function totally independently of actually being in an AST, although some ASTE's are required to be in an AST. Each ASTE is similar to that used in the DAS facility, and includes an STD value to determine the real address by the DAT 108, as discussed in connection with FIG. 10.

There are two access lists available to a program at the same time each representing a different capability domain. One access list is called the dispatchable unit access list (DUAL) and the other the primary space access list (PSAL). A bit in the ALET determines whether the ALEN of the ALET is pointing to an entry in the DUAL 114 or the PSAL 115. Each entry in the access-lists 114 and 115 is available for use by programs.

The DUAL domain is intended to be permanently associated with the dispatchable unit ("task" or "process") on behalf of the program or programs executed by the dispatchable unit. There is a unique DUAL for every dispatchable unit in the system. The DUAL for a dispatchable unit does not change even though the dispatchable unit may execute programs in many different address spaces. The PSAL domain is associated with a primary address space. This allows programs executing within a primary space to share access to a common set of address spaces. The PSAL changes when the primary address space changes such as on a space switching PC operation. A program, in possession of a valid ALET, may access an access list entry on either the DUAL 114 or the PSAL 115, and this entry specifies the desired address space. Other domains may also be implemented and controlled in a similar manner using the ALET and selected control registers. For example, a system wide access list (SWAL) domain may be created having the capabilities of all programs in the system. Various subsets of domains can be constructed as desired, such as a SASN domain access list (SSAL), to allow further exploitation of an existing mechanism.

Entries 0 and 1 of the DUAL are not used because the ALET's are reserved for accessing operands in the primary and the secondary address spaces, respectively, when in the AR addressing mode. The addressing mode of the CPU is designated by bits in the PSW. When the CPU is in the AR addressing mode, an ALET having an ALEN of zero always refers to the primary address space and an ALET having an ALEN of one always refers to the secondary address space. See FIG. 11 in which box 119 identifies these special ALETs and provide the correct STD for the PASN and the SASN to DAT when they occur. When the CPU is in the home addressing mode, the home address space is the source of instructions to be executed and of data. The home address space is defined as that address space having the supervisor control information for the program being executed. By convention, the operating system assigns an ALEN of 2 for each home space for the purpose of data access and the STD for the home space is obtained by ART for such access. Since the STD values for the primary and the secondary address spaces are kept in control registers 1 and 7, respectively, access list entries 0 and 1 are not used. As implemented, entries 0, 1 and 2 in the PSAL 115 are unused and are marked invalid.

An ART lookaside buffer (ALB) 1100 receives and saves inputs from the AR 112, and AL 115, and the AST 118 to hold the STD resulting from ART. The ALB also retains the access list designation, DUCT or PSAL. When the same ALET is used again, ALB 1100 provides the correct output directly to DAT 108 so that ART does not have to be repeated.

This process of Access Register Translation generates the STD (200) in FIG. 2 that is used in the translation process, shown at 4 in FIG. 2.

3. Use of a Data Space for Data Isolation

The data space described above is particularly well suited for use by an applications program as a data repository in connection with a mechanism known in MVS/XA as "Data-in-Virtual", or DIV (see, e.g. *MVS/Extended Architecture Supervisor Services and Macro Instructions* (GC28-1154); *An Introduction to Data-in-Virtual* (GG66-0259); *MVS/Extended Architecture System Logic Library: Data-in-Virtual* (LY28-16551)).

Figure 12:
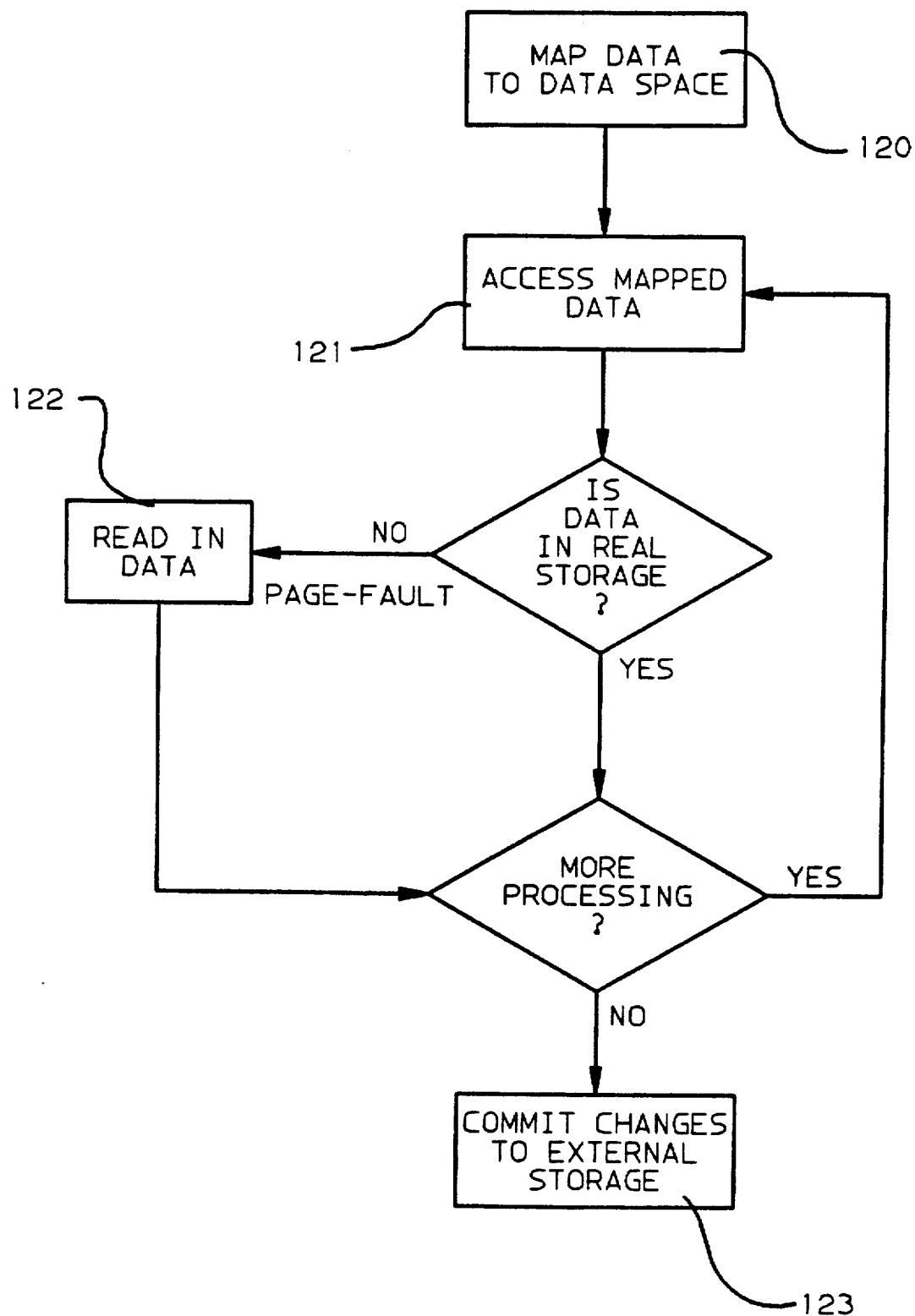
FIG. 12 is a block diagram illustrating the use of a data space for data isolation, using the Data-in-Virtual mechanism.

Using the DIV technique, it is possible to map a large data set residing on external storage into a contiguous address range within a data space, and operate on it. This use of a data space is illustrated in FIG. 12. The large potential size of a data space, with no common area "holes" to work around (see FIGS. 1A and 1B) makes it possible to map a large data set (up to 2 gigabytes) into a data space (120). It can then be accessed by the applications programmer as if it had been read into storage (121), even though data set pages are brought into main storage automatically by the system only if actually accessed (122). Finally, the system monitors changes pages, and writes to external storage only changed pages in the commit process (123).

Thus, while the invention has been described with reference to preferred embodiments thereof, it will be understood by those skilled in the art that various changes in form and details may be made without departing from the scope of the invention.

Having thus described our invention, what we claim as new and desire to secure by Letters Patent is:

1. In a central processing complex comprising a CPU, main storage, system resources connected to the CPU and to the main storage, and an operating system supporting a plurality of virtual address spaces containing instructions and data, each of said virtual address spaces comprising virtual addresses at least one range of said virtual addresses being termed a segment, said segment having an included range of virtual addresses termed a page, a mechanism for supporting two distinct virtual address space types, a program address space type comprising one or more program address spaces in which at least one common range of virtual addresses represents virtual storage that is common to all such program address spaces, and a data address space type comprising one or more data spaces in which said at least one common range of virtual addresses represents virtual storage unique to each data space, said mechanism comprising:

(a) storage access control means for accessing main storage using a real address;

(b) translator means for translating any supplied virtual address, supplied by a supplying one of said virtual address spaces and associated with a first one of said virtual address spaces, into an associated real address for use by said storage access control in accessing main storage, (c) segment table descriptor (STD) selector means, within said CPU, for associating an STD with said any supplied virtual address, (d) tale means in main storage comprising a segment table, located by each STD, said segment table having segment table entries, each of said segment table entries locating a page table, said table means usable by said translator means in translating said any supplied virtual address, (e) a dynamic lookaside table (DLAT) coupled to said storage access control and having DLAT entries comprising a DLAT virtual address associated with a particular virtual address space, a corresponding previously translated DLAT real address, and segment table origin ID having a plurality of possible values, one possible value being a common indicator indicating that the DLAT virtual address in the entry having the common indicator falls within said at least one common range, said DLAT entries usable by said storage access control for bypassing said translator means for translating any supplied virtual address, (f) a data space indicator associated with said any supplied virtual address and identifying said any supplied virtual address as being associated with either any one of said one or more program address spaces (the being said to be "off") or any one of said one or more data spaces (then being said to be "on"), and (g) DLAT read control means, coupled to said DLAT, and responsive to said data space indicator, for directly obtaining from the DLAT the associated real address for use by said storage access control means, thus permitting bypass of the translator means when said data space indicator is "off" if:

(1) said any supplied virtual address matches the DLAT virtual address of a first one of said DLAT entries, and said DLAT entry has the common indicator, so that said first one of said DLAT entries for said any supplied virtual address is shared by all of said program address spaces, but directly obtaining from the DLAT the associated real address thus permitting bypass of the translator means when said data space indicator is "on" only if:

(1) said any supplied virtual address matches the DLAT virtual address of a second one of said DLAT entries, and (2) the particular virtual address space associated with the DLAT virtual address of the second one of said DLAT entries is the data space containing said any supplied virtual address, so that the second one of said DLAT entries cannot be shared among said data spaces, even if it has the common indicator.

2. The mechanism of claim 1, further comprising:

(a) low address protection means for preventing a store instruction, of said instructions, from storing into low virtual storage of a target virtual address space;

(b) override means for overriding said low address protection means when said data space indicator indicates that the target address space is of the data address space type.

3. The mechanism of claim 2 in which said data space indicator is located in the segment table descriptor.

4. The mechanism of claim 3 in which said STD selector means comprises:

(a) a plurality of general register means for holding said any supplied virtual address;

(b) a plurality of access register means each associated with a particular one of the plurality of general register means, each of said access register means having the capability of holding an access list entry token (ALET), (c) access list means for associating the ALET in any access register means with an associated STD.

5. In a central processing complex comprising a CPU, main storage, system resources connected to the CPU and to the main storage, and an operating system supporting a plurality of virtual address spaces each of said virtual address spaces having at least one range of virtual addresses termed a segment, said segment having an included range of virtual addresses termed a page, some of said virtual address spaces being designated as program address spaces containing instructions and data in which at least one common range of virtual addresses represents virtual storage that is common to all such program address spaces, other of said virtual address spaces being designated as data spaces containing only data in which said at least one common range of virtual addresses represents virtual storage unique to each data space, a method of using virtual addressees to derive real addresses to access main storage by a storage access control comprising the steps of:

(a) determining, for a supplied virtual address, a virtual address space with which said supplied virtual address is associated, (b) translating the supplied virtual address into a corresponding real address, using a table means, and supplying the corresponding real address to the storage access control, (c) storing the translated virtual address with corresponding real address as an entry in a dynamic lookaside table (DLAT), (d) having a DLAT read control use said entry to obtain the corresponding real address and so bypass the translation means if a subsequently supplied virtual address matches the translated virtual address in said entry, and both said subsequently supplied virtual address and said translated virtual address are associated with the same virtual address space, and (e) if step (d) did not result in using said entry because, although said subsequently supplied virtual address matched said translated virtual address, both were not associated with the same virtual address space, (1) determining whether said subsequently supplied virtual address is within one of said data spaces, and (2) nevertheless having the DLAT read control use said entry to obtain the corresponding real address and so bypass the translation means only if said subsequently supplied virtual address falls within said at least one common range, and is not within any of said data spaces.

6. The method of accessing main storage of claim 5, in which said step of determining a virtual address space with which said supplied virtual address is associated further comprises the steps of:

(a) associating an access register, containing an access list entry token (ALET) associated with a first one of said virtual address spaces, with a general register containing said supplied virtual address, (b) using said ALET to locate the table means for use in said translating step.

* * * * *